(No Model.)
T. McGOWAN.
PROCESS OF AND MECHANISM FOR DISTILLING HYDROCARBONS.
No. 257,961. Patented May 16, 1882.
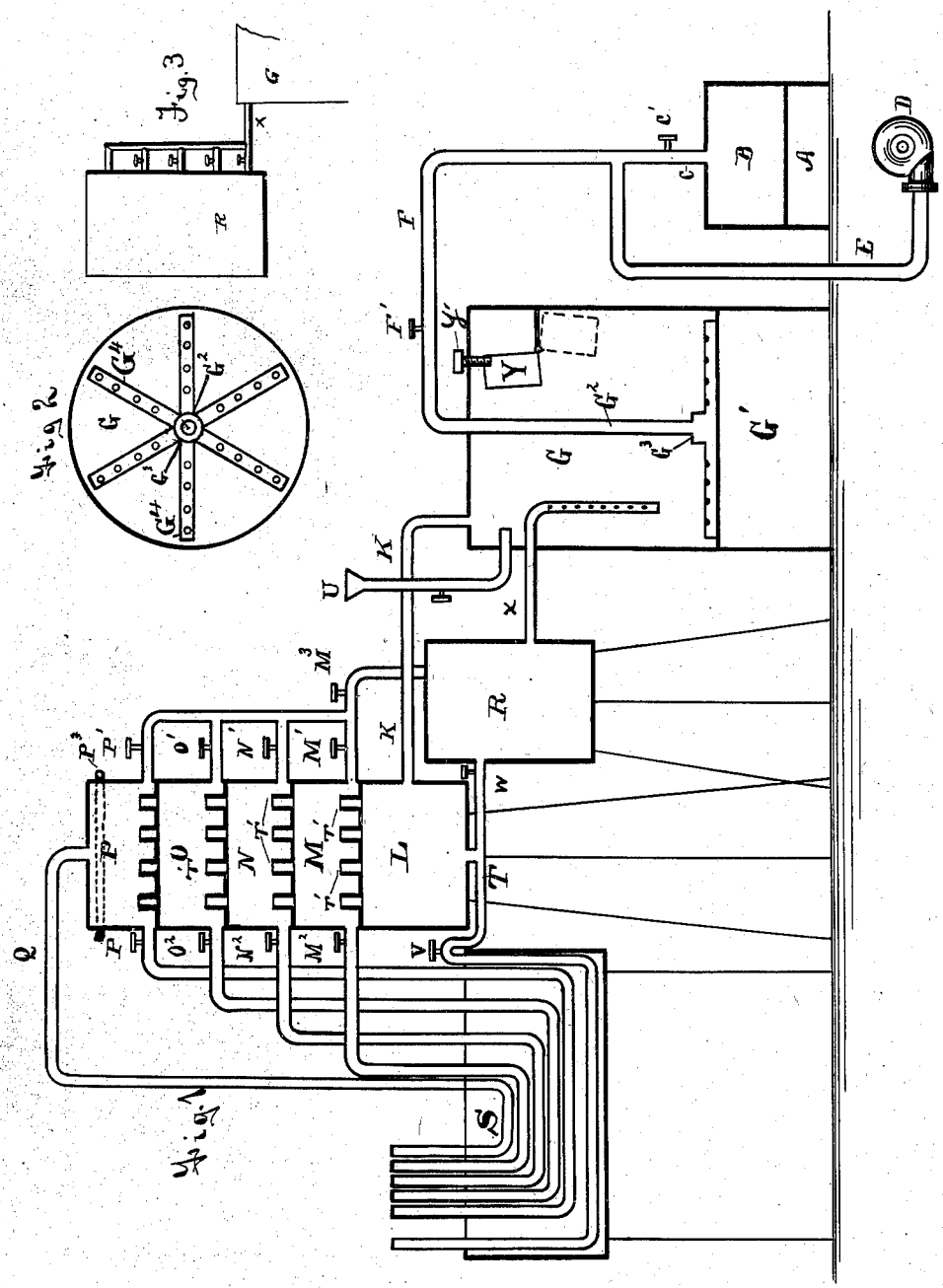
WITNESSES
INVENTOR
ATTORNEY

UNITED STATES PATENT OFFICE.

THOMSON McGOWAN, OF CLEVELAND, OHIO.

PROCESS OF AND MECHANISM FOR DISTILLING HYDROCARBONS.

SPECIFICATION forming part of Letters Patent No. 257,961, dated May 16, 1882.

Application filed May 24, 1880. (No model.)

*To all whom it may concern:*

Be it known that I, THOMSON McGOWAN, of Cleveland, in the county of Cuyahoga and State of Ohio, have invented certain new and useful Improvements in Hydrocarbons and Processes of and Mechanism for Manufacturing the same; and I do hereby declare the following to be a full, clear, and exact description of the invention, such as will enable others skilled in the art to which it pertains to make and use it, reference being had to the accompanying drawings, which form part of this specification.

My invention relates to an improved product of petroleum and to the distillation of hydrocarbons.

It consists, first, in said product (desulphurized petroleum) and in a process of distilling and purifying the same; and, secondly, in mechanism for carrying out the process.

It has been ascertained that sulphur enters into and is a constituent element of crude petroleum, and that to its presence are due, first, much of the unpleasant odor thrown off by the petroleum-lamp when burning, and especially when the flame of the lamp is turned down; second, that much of the difficulty and expense attendant upon the manufacture of petroleum is due to the presence of sulphur in chemical combination, and that a removal of it lessens this difficulty and expense, rendering it comparatively easy to obtain an illuminator after such removal that will be white in color, burn freely with an ordinary wick, and give a clear white light; third, that the presence of sulphur is detrimental to the health of the consumer to an extent not realized, especially when the oil is burning in a close, ill ventilated room.

My process and mechanism have for their object the removal of the sulphur during the progress of the distillation—the only time when it can be economically removed.

My process consists in forcing oxygen into petroleum while it is being distilled, beginning when the petroleum is at a temperature of about 300° Fahrenheit, and continuing such use of oxygen to the end of the distillation and the simultaneous use of an alkali that will change the oxidized sulphur into a salt.

In the drawings, Figure 1 is a sectional view of a device adapted to carry out my process. Fig. 2 is a plan view of the bottom of the still, showing the perforated pipes through which oxygen is conveyed to the petroleum during the process of distillation.

In the said drawings, G represents a still or retort, into which the substance to be distilled and purified is placed.

G' represents the fire-box beneath the still; K, the vapor-pipe leading from the still to the condensing-cylinder. This condensing-cylinder is preferably made of iron, and consists of a vertical cylinder of any suitable height and diameter proportionate to the size of the still with which it is connected, divided into compartments L M N O P, which compartments are separated from each other by perforated disks, the perforations in said disks being also of a diameter proportionate to the size of the cylinder and the quantity of vapor to be condensed. Into each of these perforations are fastened, by screw-threads or otherwise, short tubes, to prevent any product from flowing from the one compartment in which it may have been condensed down and into those below.

M' N' O' P' W represent stop-cocks upon pipes leading from the lower part of each compartment to the drum R.

$M^2$, $N^2$, $O^2$, $P^2$, and V represent stop-cocks upon pipes leading from the lower part of each compartment to and through a condensing or worm tub, S, which tub S is filled with water.

D represents an air or gas pump, having a pipe, E, leading from it, and communicating with the pipe F.

B represents a retort, set over a fire-box, A, in which gases or vapors are generated as may be required in the process of distilling and purifying. From B the pipe C, having in it a stop-cock, C', leads also to the pipe F.

The pipe F, having in it the stop-cock F', leads from the point of union of the pipes E and C to the top of the still G, from thence down through the top of the still G to the bottom of the same, and is there connected with a small drum, $G^3$, (shown in Fig. 2,) from which drum radiate the pipes $G^4$.

The pipe X leads from the drum R to and through the sides of the still G near its top, and extends down to within a few inches of the bottom of the still. This pipe is perforated in its vertical section within the still, so that any liquid flowing back from the drum R may escape into the body of the still through the perforation in the pipe nearest the surface of the substance in the still.

The pipe U, having a funnel mouth, leads through the side of the still near the top, and may be coiled through the body of the still to whatever length may be found necessary. This pipe has a stop-cock on the outside of the still.

Y is a box within the still G, hinged at its bottom, and held in a vertical position by means of the set-screw G', which can be manipulated from the outside of the still. When this set-screw is released the box Y will be inverted, thereby enabling it to empty its contents into the still.

The pipe Q leads from the top of the condensing-cylinder down into and through the worm-tub S, and its being always open permits any gases or vapors which cannot be condensed in any of the compartments L, M, N, O, or P to escape.

The pipe $P^3$ encircles the condensing-cylinder near its top, and is perforated with small holes on its side nearest the cylinder. Through this pipe water is conveyed and sprayed against the outer surface of the cylinder, from whence it flows down the side of the cylinder and assists in condensing the vapor in the cylinder. It may be collected in a tub placed beneath the cylinder and conducted from thence into the worm-tub S, or it may be permitted to escape. When this water-pipe $P^3$ is used I find it preferable to surround the cylinder with a sheet-iron jacket, placing the jacket between the cylinder and the two lines of stop-cocks $M^2$ $N^2$ M' N'.

Having thus described the construction of my device, its operation is as follows: Place the petroleum in the still G and close the stop-cocks W, M', N', O', and C', leaving open the stop-cocks V, $M^2$, $N^2$, $O^2$, $P^2$, and F'. Start the fires in the fire-box G'. When the pyrometer on the still marks 70° Fahrenheit start the air-pump D and force a blast of air through the pipes E, F, and $G^2$ into the drum $G^3$, and from thence through the perforated pipes into the petroleum in the still. The two lines of stop-cocks on the condensing-cylinder can now be used to regulate the flow of products of distillation. A wide difference in specific gravity will be found between the product coming from the still through the pipes Q and T, and each of the pipes leading from the several compartments of the cylinder will be found to be carrying a product of distinct specific gravity—the higher up on the cylinder the pipe the lighter the specific gravity.

Should it be desirable to prevent the product of any compartment from passing down through the worm-tub S—say that from compartment L—all that will be necessary to do will be to close the stop-cock V and open stop-cock W, when such product will run from compartment L to the drum R, and from thence through pipe X back into the still G. In this manner the product of any of the compartments can be returned for a second distillation to the still G. By a proper handling of these stop-cocks it will be possible to make an almost perfect separation of the lighter products of petroleum into light naphtha and illuminating-oil, thus at one distillation accomplishing what is ordinarily the work of two or more distinct distillations, thereby making a great saving of labor in the process of distillation. When the pyrometer marks a temperature in the still of about 200° Fahrenheit open the stop-cock C' and allow the gas being generated in the retort B to escape through the pipe C into the air-blast in the pipe F, and thence with the air into the still.

If oxygen is forced into petroleum while it is being distilled, it will be found that at the temperature of about 300° Fahrenheit both sulphurous and sulphuric acid gases will be formed by the union of such oxygen and the sulphur in the petroleum. These sulphur compounds will give the products of distillation a deep-red color, which will be accompanied by an odor peculiarly offensive, and the gases themselves will be found to attack the eyes, causing irritation and pain. This deep red color, if once communicated to the distilled products or distillates, cannot be removed by the ordinary means used to purify and whiten such distillates. This permanent coloring must be prevented, and this I accomplish by means of the gases from the retort B. For this purpose I use ammonia-gas, which may be made to pass from the retort B, in which it is generated, into the still. I have used also for this purpose solid caustic soda, which at the proper time was dropped from the box Y into the still. I have also allowed concentrated ammonia-liquor to drop slowly into the pipe U and pass through this into the still. I prefer, however, to use the ammonia-gas, as described, for by its use I have been able to so neutralize the action of the sulphur compounds as to permit an economical chemical treatment of the liquid products of distillation and obtain a high grade of white oil. I have also been able to make an excellent illuminating-oil of a high fire-test by the use of the drum R. This drum should be of a capacity proportionate to the size of the still, and can be so arranged with reference to the still G by means of suitable pipes, as illustrated in Fig. 3 of the drawings, that any desired percentage of the oil originally put into the still G will be left in the drum R at the end of the distillation. This can be done by a series of pipes coming from the side of the drum R, having a stop-cock on each one, and all communicating with the pipe X. This pipe taps the drum R at varying heights, and thus by leaving any particular one open and the others shut a corresponding quantity of oil will be found in the drum R at the end of the distillation. This oil can be congealed, the paraffine removed by the usual methods, and, after proper chemical purification, an excellent illuminator obtained.

By the introduction of oxygen into petroleum while it is in progress of distillation and at a temperature of 500° Fahrenheit and above carbonic dioxide is formed by a union of the oxygen introduced and the carbon of the petroleum. This carbonic dioxide passes off through the vapor-pipes of the cylinder, and its removal assists in the manufacture of a better illuminator than would be otherwise obtained.

The removal of the excess of carbon in the oil during the latter part of a distillation renders the product obtained more limpid, of a lighter specific gravity, and in consequence a product which resists the capillary action of the lamp-wick to a less extent.

I am aware that various oxidizing agents have been used to remove the sulphur held in suspension in shale-oils, and this has been done successfully.

I am not aware that any process has yet been made known prior to this one I have discovered which will remove sulphur held in chemical combination. I hold that the oxidizing agents heretofore used, from the manner in which they were used, would not, could not, and were not intended to remove sulphur as it is found in American petroleum—that is, in chemical combination with the hydrogen and carbon. Oxygen and an alkali must be simultaneously introduced into the petroleum when such petroleum is being disintegrated by a heat of 300° Fahrenheit and above. Shale-oils and American petroleum are, however, two different substances. Hence a process applicable to one might not be used successfully with the other; but even with shale-oils I deny that any oxidizing agent, unaccompanied by an alkali, and brought in contact with the shale-oil at a lower temperature than 300° Fahrenheit, would remove from such shale-oil any sulphur which it might hold in chemical combination.

What I claim is—

1. As a new article of manufacture, desulphurized American petroleum-oil.

2. The herein-described process for the removal of sulphur from petroleum, consisting in introducing oxygen and an alkali simultaneously into the petroleum, substantially as set forth.

3. The herein-described process for the removal of sulphur from petroleum, consisting in introducing oxygen and an alkali simultaneously into the body of the petroleum during distillation and when the temperature thereof is 300° Fahrenheit or above, substantially as set forth.

4. In an apparatus for the distillation of hydrocarbons, the combination, with an upright condenser divided into a series of horizontal compartments which collect different grades of hydrocarbon, of devices connecting respectively with the compartments to conduct said different grades of hydrocarbon to the receiving-house and to the still, substantially as set forth.

In testimony whereof I have signed my name to this specification in the presence of two subscribing witnesses.

THOMSON McGOWAN.

Witnesses:
JNO. CROWELL, Jr.
W. E. DONNELLY.